US011449963B1

(12) United States Patent
Beeler et al.

(10) Patent No.: US 11,449,963 B1
(45) Date of Patent: Sep. 20, 2022

(54) VIRTUAL GRAPHICS PROCESSING WITH REMOTE EXECUTION

(71) Applicant: Juice Technologies, Inc., Lafayette, CA (US)

(72) Inventors: Dean J. Beeler, Dana Point, CA (US); David A. McCloskey, Sacramento, CA (US)

(73) Assignee: Juice Technologies, Inc., Lafayette, CA (US)

( * ) Notice: Subject to any disclaimer, the term of this patent is extended or adjusted under 35 U.S.C. 154(b) by 0 days.

(21) Appl. No.: 17/184,417

(22) Filed: Feb. 24, 2021

Related U.S. Application Data

(60) Provisional application No. 62/980,542, filed on Feb. 24, 2020.

(51) Int. Cl.
| | | |
|---|---|---|
| G06T 1/20 | (2006.01) | |
| G06T 1/60 | (2006.01) | |
| G06F 9/50 | (2006.01) | |
| G06F 9/54 | (2006.01) | |
| H04L 67/568 | (2022.01) | |
| H04L 67/01 | (2022.01) | |

(52) U.S. Cl.
CPC .............. G06T 1/20 (2013.01); G06F 9/5083 (2013.01); G06F 9/541 (2013.01); G06T 1/60 (2013.01); H04L 67/01 (2022.05); H04L 67/568 (2022.05)

(58) Field of Classification Search
CPC . G06T 1/20; G06T 1/60; G06F 9/5083; G06F 9/541; H04L 67/2842; H04L 67/42
See application file for complete search history.

(56) References Cited

U.S. PATENT DOCUMENTS

| | | | | |
|---|---|---|---|---|
| 8,169,436 B2* | 5/2012 | Rivera | .................... | G06F 9/453 345/522 |
| 9,183,663 B1* | 11/2015 | Tidd | .......................... | G06F 3/14 |
| 10,074,206 B1 | 9/2018 | Ingegneri | | |
| 10,649,790 B1 | 5/2020 | Ingegneri | | |
| 2012/0239811 A1* | 9/2012 | Kohli | .................... | H04L 67/327 709/226 |
| 2014/0032964 A1* | 1/2014 | Neerincx | ............ | G06F 16/2308 707/634 |

* cited by examiner

*Primary Examiner* — Jennifer Mehmood
*Assistant Examiner* — Donna J. Ricks
(74) *Attorney, Agent, or Firm* — Nicholson De Vos Webster & Elliott LLP; Judith Szepesi

(57) ABSTRACT

A method is described for processing commands for a client computing device using a remote graphics processing unit server. The method includes receiving, by a display driver of the client computing device, a command from an application operating on the client computing device and compressing, by the display driver, the command to generate a compressed command. Compressing the command includes determining whether a resource associated with the command is available in a cache of the remote graphics processing unit server and replacing the resource with a reference to the resource, when the resource is available. The display driver transmits the compressed command to the remote graphics processing unit server for processing by a remote graphics processing unit (GPU) and receives data generated by the remote GPU based on processing the compressed command.

20 Claims, 10 Drawing Sheets

VIRTUAL GRAPHICS PROCESSING WITH REMOTE EXECUTION

RELATED APPLICATION

This application claims the benefit of U.S. Provisional Patent Application No. 62/980,542, filed Feb. 24, 2020, which is incorporated by reference herein in its entirety.

TECHNICAL FIELD

The present disclosure generally relates to a graphics processing system, and more specifically, relates to virtual graphics processing with remote execution.

BACKGROUND

Computing devices can include a Graphics Processing Unit (GPU), which can perform certain computing and rendering tasks substantially more quickly than the tasks could be performed on the device's Central Processing Unit (CPU). The decision as to which tasks should be performed on the CPU and which tasks should be performed on the GPU may be made by the designer of a computer program, or the decision may be made algorithmically based on criteria related to the task and the characteristics of the computing device. Although offloading tasks to a GPU on the device may offer performance gains, this technique requires the computing device to maintain a GPU and to incur the power costs associated with running such a GPU.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1A:
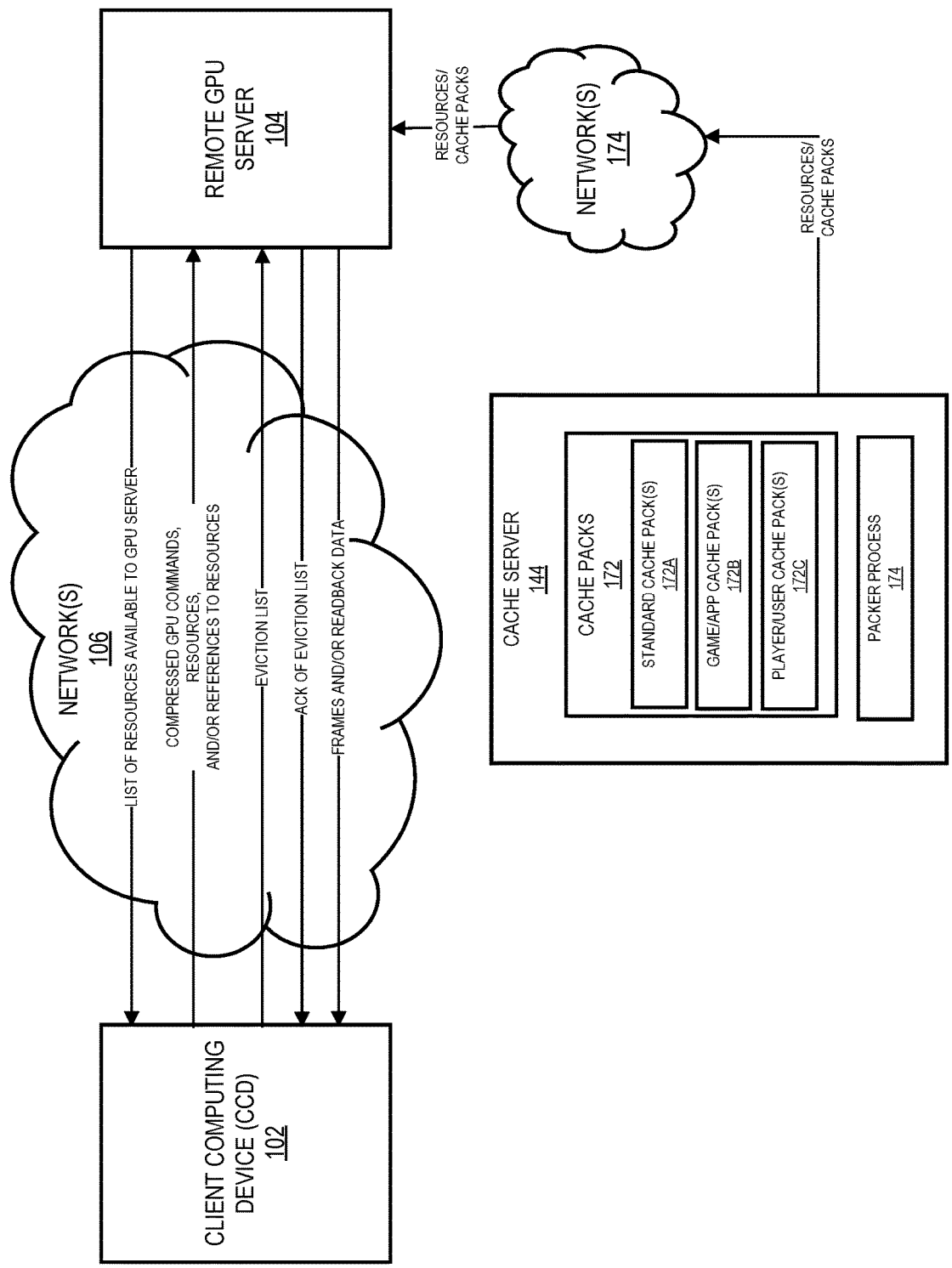
FIGS. 1A-C illustrate a system, including a client computing device and a remote graphics processing unit (GPU) server, in accordance with some embodiments of the present disclosure.

The present disclosure generally relates to a client computing device utilizing graphics processing on a remote graphics processing unit (GPU) server. The system can take advantage of a remote graphics processor for a software application running on a client device, and does not require modification of the software. In some embodiments, the system can support multiple software applications. The remote GPU server can provide GPU services virtually to a number of client devices. In the following detailed description, only certain embodiments of the present invention have been shown and described, by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Figure 1B:
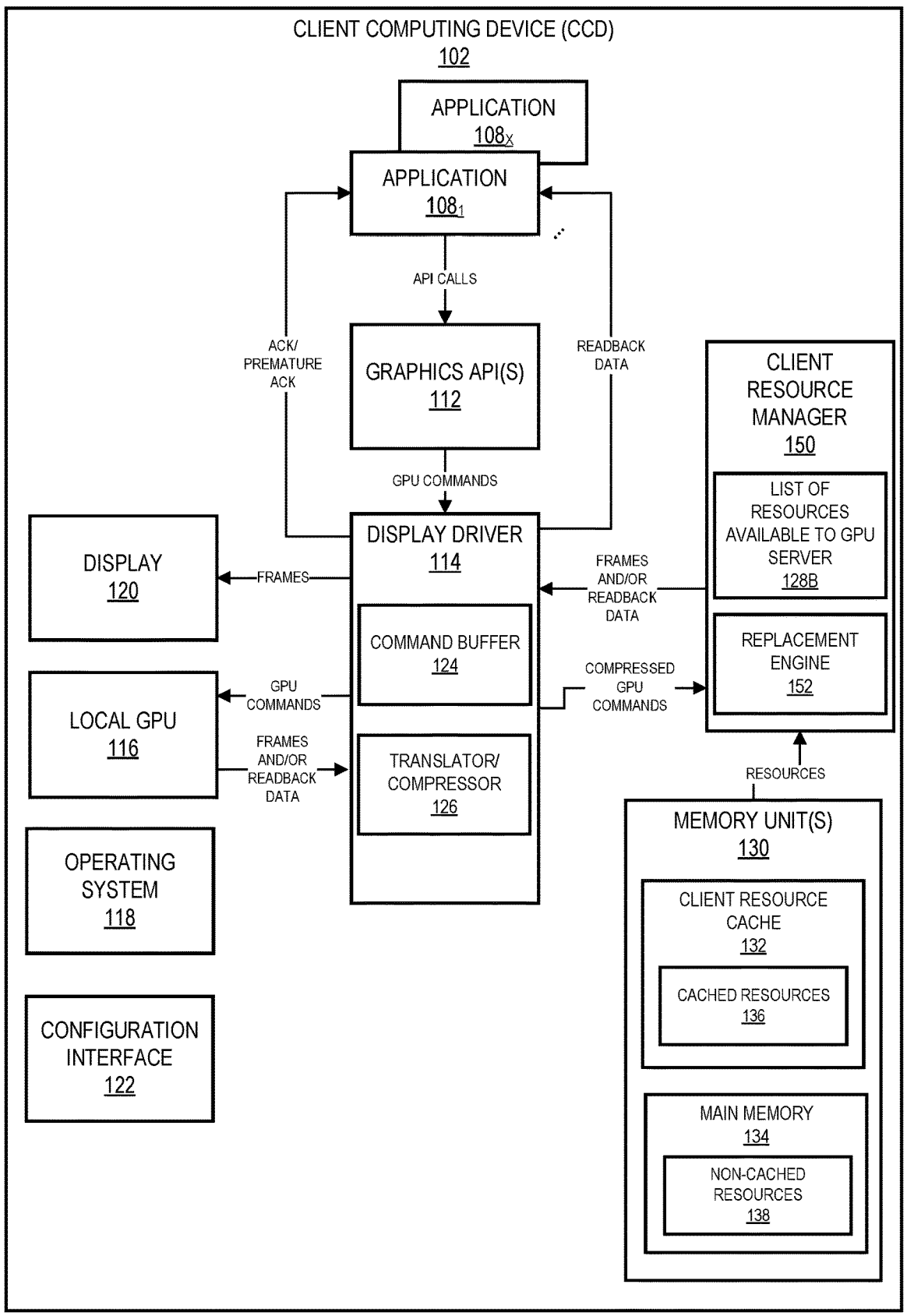
Figure 1C:
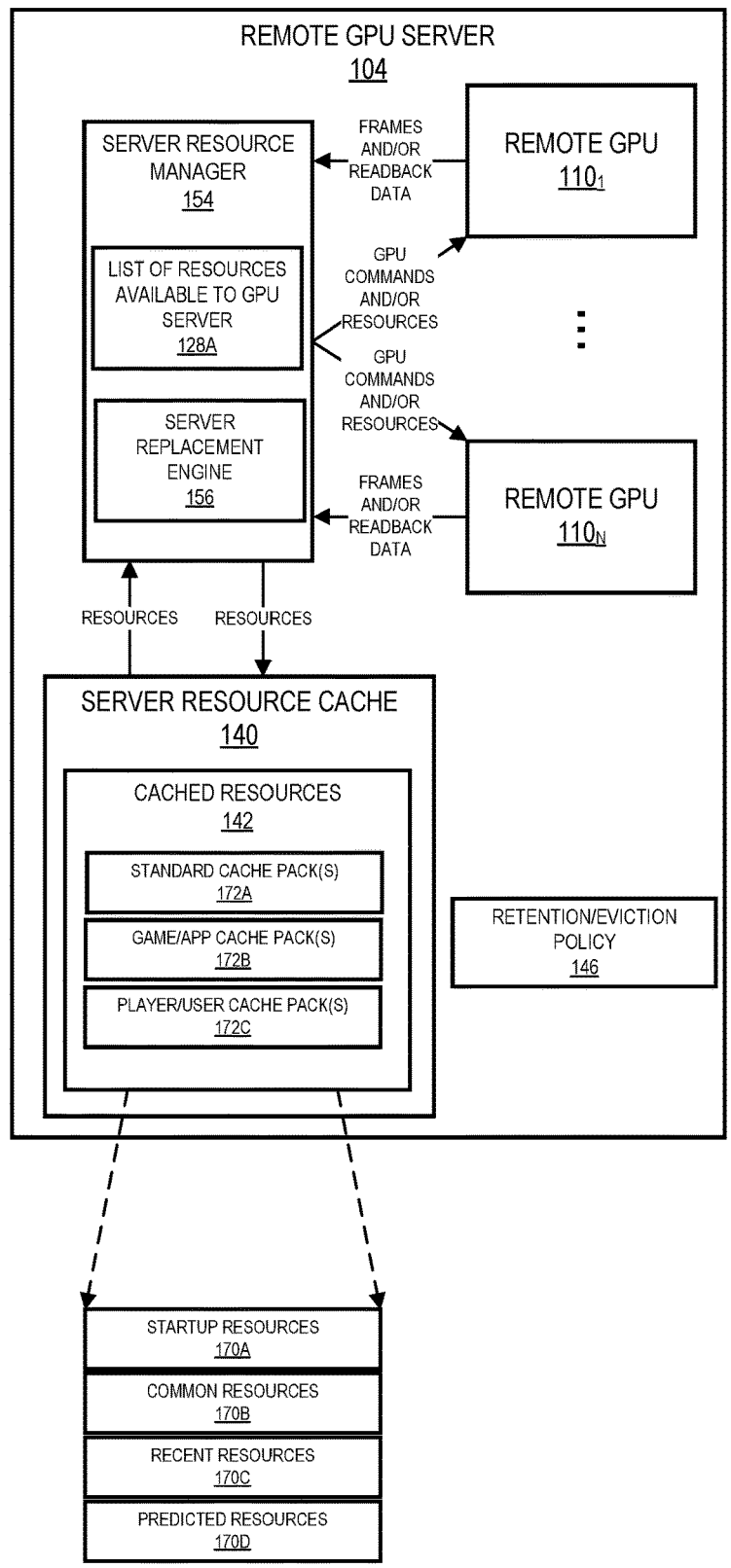

FIGS. 1A-C show a system 100, according to one example embodiment. As shown in FIG. 1, the system 100 may include a client computing device 102 (sometimes referred to as a client device 102, a computing device 102, or CCD 102) that is communicatively coupled to a remote GPU server 104 (sometimes referred to as a GPU server 104) via network(s) 106. Network 106 may be a combination of one or more local area networks (e.g., Ethernet and WiFi networks) and wide area networks (e.g., the Internet or cellular networks). The client computing device 102, the GPU server 104, and the devices that make up the network 106 may be electronic devices.

Although shown with a single client computing device 102 and a single GPU server 104, this configuration of the system 100 is for illustrative purposes. In other example configurations, the system 100 can include multiple client computing devices 102 that are each communicatively coupled to one or more GPU servers 104. In one embodiment, a client computing device 102 may be coupled to more than one remote GPU server 104.

As will be described in greater detail below, the system 100 allows a client computing device 102 to offload/assign processing to a remote GPU server 104 for processing. In particular, as shown in FIG. 1B, the client computing device 102 may include a set of applications $108_1$-$108_x$. Each of the applications $108_1$-$108_x$ may be a process/program that includes processing/rendering of video frames (e.g., a video game application) or another process/program that can utilize the processing capabilities of a dedicated GPU (e.g., a cryptocurrency mining application).

For purposes of illustration, the graphics processing system 100 will be described primarily in relation to a video game or another graphics-oriented application 108 that seeks to offload processing of frames to a remote GPU 110 in a GPU server 104. However, as noted above, the remote GPU server 104 in the system 100 can support other applications and corresponding processing.

Each application 108 may be represented by or otherwise include programming code, including one or more application programming interface (API) calls that corresponds to one or more graphics APIs 112. For example, a command from application 108 may be translated into one or more of an OpenGL, OpenCL, DirectX, or Vulkan graphics API 112. As used herein, the graphics APIs 112 are computing interfaces that enable interactions between multiple software intermediaries, which define the kinds of calls or requests that can be made by applications 108, and how these calls from applications 108 are translated for the appropriate GPU. These graphics APIs 112 may be used for allowing an application 108 to interact with a GPU to achieve hardware-accelerated rendering of graphics or other accelerated processing of data. In some embodiments, the application 108 doesn't make calls, but rather rendering commands are directed to a GPU via graphics API 112, as is known in the art.

In one embodiment, an API call from an application 108 is passed to the graphics API 112, such that the graphics API 112 can convert or otherwise translate the instructions into corresponding GPU commands (sometimes referred to as commands or graphics commands) to be processed by a GPU. In one embodiment, the graphics API 112 may be unaware of whether local GPU 116 or remote GPU 110 will be processing the commands. In particular, a graphics API 112 may convert a single instruction into multiple commands or combine multiple instructions into fewer commands (e.g., Z API calls may be translated into Z, Z–1, Z–2, . . . , or 0 commands).

The API call and the GPU commands may include or otherwise reference resources. For example, in the context of a video game application 108, an API call and/or a GPU command may include texture data and/or geometry data that may be the subject of corresponding processing by a remote GPU 110 to generate a frame in a framebuffer.

As shown in FIG. 1B, the client computing device 102 may include a display driver 114 (sometimes referred to as a GPU driver 114). As will be described herein, the display driver 114 may abstract from the applications 108 the use of the GPU server 104 and corresponding remote GPUs 110 for GPU processing tasks. Virtual graphics processing with remote execution provides to the client computing device 102 computational and rendering benefits normally afforded by a locally installed GPU. Although the client computing device 102 may have a locally installed GPU (local GPU 116), the local GPU 106 of the client computing device 102 may have insufficient power to meet the demands of one or more applications 108. The insufficiency of the local GPU 116 or the lack of a locally installed GPU can be addressed through the use of a remote GPU 110 on the GPU server 104.

In this context, the display driver 114 receives GPU commands that originated from applications 108 (via graphics API 112) and fulfills these GPU commands via the remote GPUs 110 of the GPU server 104. The display driver 114 behaves to an operating system 118 of the client computing device 102 as if it were a display driver that did not rely on the remote GPU server 104 for processing support but instead relied on a locally installed GPU. Accordingly, applications 108 do not need to be modified to work with the GPU server 104. The only actions required from a user of the client computing device 102 is the installation and enabling of the display driver 114, and associated client resource manager 150, in the same or a similar fashion as they would any other display driver that would interact with a local GPU. In some embodiments, the display driver 114 can be configured by a user of the client computing device 102 via the configuration interface 122 to (1) communicate with a particular GPU server(s) 104, when multiple possibilities are available and/or (2) setup a payment method for using a GPU server 104 owned or managed by a different entity than the owner/user of the client computing device 102. The user may also set, via configuration interface 122, which applications 108 may use the GPU server 104. The configuration interface 122 may be a web interface that prompts a user of the client computing device 102 for inputs to configure use of the GPU server 104.

For the display driver 114 and corresponding remote GPUs 110 to appear to an operating system 118 of the client computing device 102 as if the remote GPUs 110 were locally installed/accessible, the operating system 118 should be tricked into believing that an appropriate GPU component is attached to its Peripheral Component Interconnect (PCI) bus or a similar or another such connection. In a Windows or Linux based operating system, this task may be accomplished, in one embodiment, using a PCI filter driver that forces the input/output control (IOCTL) device enumeration to include a device identifier corresponding to the remote GPU 110 and/or the GPU server 104 and which causes the display driver 114 to act in a similar fashion as if the display driver 114 did not rely on remote processing.

Further, the display driver 114 supports all components to expose GPU acceleration to applications 108 and the operating system 118. For example, when the operating system 118 is a Windows operating system, kernel-level DirectX Graphics Kernel Subsystem (DXGK) and user-level User Mode Driver (UMD) may be provided. Further, OpenGL Installable Client Driver (ICD) hooks may be presented to the operating system 118. With the operating system hooks in place, the graphics APIs 112, such as OpenGL, OpenCL, DirectX, and/or Vulkan, become available. Although described in relation to a filter driver, use of a filter driver is not required and in other embodiments, PCI filtration may be skipped in lieu of an alternative mechanism for device detection.

The display driver 114 may include a command buffer 124 for storing GPU commands as they come in from the graphics APIs 112. Although shown as a single command buffer 124, in some embodiments, separate command buffers 124 may be provided per application 108 or per instance of each application 108. In some embodiments, the GPU commands in the command buffer 124 may be condensed and standardized into a single command buffer stream along with a single shader language. In some embodiments, the shader language can be the Standard Portable Intermediate Representation-V (SPIR-V) language although other shader languages, or combinations of multiple shader languages, could be used. In some embodiments, a shader language specifically intended for the system 100 can be defined and used, while in other embodiments an arbitrary shader language may be used.

Graphics APIs 112 differ in many important and critical ways. The principal difference, beyond actual API implementations, is the shader language. Shader languages represent the high-level abstractions of hardware GPU instruction sets. These hardware GPU instruction sets change frequently and, while it is preferable to optimize shaders before deployment, assembling them for a specific generation of hardware is limiting. Shader languages have changed frequently as hardware has adapted and evolved. Maintaining compliance and backwards compatibility with shader versions and capabilities has been a challenge. In some embodiments, the translator/compressor 126 can perform translation of the GPU commands to convert from one language to another language. In one embodiment, the translator/compressor 126 may include conversion libraries to facilitate conversions between languages. For instance, the translator/compressor 126 may maintain a DirectX-to-Vulkan conversion library, an OpenGL-to-Vulkan conversion library, and an OpenCL-to-Vulkan conversion library such that a GPU command that is based on any of these languages is converted to Vulkan. Although Vulkan is used as the target language in this example embodiment, in other embodiments, other target languages can be used. For example, in some embodiments, a derivative of Vulkan can be used, in which the language is extended to address latency and other concerns/factors in utilizing remote GPUs 110.

When a command that causes data to be returned from a GPU is received by the display driver 114 (e.g., a Present, Swap Buffers, or Flush command), the command buffer 124 is compressed and the compressed GPU commands are transmitted to the GPU server 104. In one embodiment, compression of the command buffer 124 includes one or more of (1) command compression and (2) resource compression. With respect to command compression, the translator/compressor 126 may analyze GPU commands in the command buffer 124 for inefficiencies, including repeated commands (e.g., drawing the same line at the same location) or similar commands (e.g., drawing an identical line in a series of locations). In either case, the translator/compressor 126 may consolidate the repeated or similar GPU commands into fewer GPU commands. For example, many GPU commands may be consolidated into a smaller set of one or more GPU commands, such that the smaller set of GPU commands represents the outcome of the many GPU commands. For example, a GPU command to draw one line at an identified location instead of drawing the same line at the same location multiple times, or a GPU command to draw identical lines in a series of locations instead of multiple GPU commands to draw the identical lines in a series of locations.

With respect to resource compression, the translator/compressor 126 may compress the resources using one or more compression algorithms (e.g., Huffman encoding, transform encoding, run-length encoding, etc.). In one embodiment, the compressed GPU commands from the display driver 114 can be forwarded to a client resource manager 150 before being transmitted, via the network 106, to the GPU server 104. The client resource manager 150 will be described in greater detail below.

As noted above, the GPU commands in the command buffer 124 and the compressed GPU commands can include or otherwise can be associated with resources (e.g., meshes, textures, constant buffers, geometries, etc.). As shown in FIG. 1B, the resources can be stored in a set of memory units 130. The memory units 130 may form a hierarchical memory structure that includes (1) a client resource cache 132, which stores cached/active resources 136 (i.e., resources that were recently accessed via a GPU command and are active in an associated application 108) and (2) a main memory 134, which stores non-cached/non-active resources 138. In some embodiments, the GPU server 104 may include a server resource cache 140. The server resource cache 140 can include a set of cached resources 142 that are either received from the client computing device 102 or are loaded from a cache server 144, as will be described in greater detail below.

When resources of an associated GPU command from a client computing device 102 are not locally available to the GPU server 104 (e.g., are not cached or otherwise stored in the GPU server 104 for access by the remote GPUs 110), the client computing device 102 transmits the resources to the GPU server 104 along with the corresponding GPU command. In some embodiments, the client resource manager 150 may adjust GPU commands prior to transmission from the client computing device 102 to the GPU server 104 to account for resources that are already available on the GPU server 104.

In one embodiment, the replacement engine 152 of the client resource manager 150 analyzes each received GPU command (or compressed GPU command) to determine whether associated/included resources are available/present in the server resource cache 140 of the GPU server 104 or in cache server 144. In one embodiment, the client resource manager 150 maintains a list of all resources transmitted to the GPU server 104. In response to determining that the resource was not previously transmitted to the GPU server 104, the replacement engine 152 may transmit the resource to the GPU server 104. In one embodiment, the resource is compressed prior to transmission.

Conversely, in response to determining that the resource was previously transmitted to the GPU server 104, the replacement engine 152 may transmit an identifier of the resource to the GPU server 104 instead of the resource itself. In one embodiment, the identifier may be a hash computed based on the resource (e.g., a hash computed based on the size of the resource). In some embodiments, the hash is computed over the entire resource or on a per-block basis of the resource.

In one embodiment, the replacement engine 152 may take into account a minimal save time in determining when to transmit a resource or an identifier of the resource. The minimal save time is a time period after which a resource will be evicted by the server resource cache 140 if it was not referenced in a GPU command during the time period. In one embodiment, some resources do not have a minimal save time, but rather are maintained in the GPU server cache.

For some other resources, if the minimal save time is three seconds and the last time a reference to a particular resource was made over three seconds ago, the replacement engine 152 will assume the resource was evicted from the server resource cache 140 and resend the resource to the GPU server 104 in response to a later GPU command, which includes this resource. Upon receipt, the resource will now again be stored in the server resource cache 140 (at least for the minimal save time).

Although described above as a resource being reintroduced to the server resource cache 140 (following an eviction) based on a GPU command from the client computing device 102 (e.g., the client computing device 102 transmitting the resource along with a corresponding GPU command to the GPU server 104 in response to determining that the resource is no longer stored in the server resource cache 140), in other embodiments, the resource can be reintroduced to the server resource cache 140 from the cache server 144 instead of from the client computing device 102. As will be described in greater detail below, the cache server 144 holds resources for long-term storage. In this configuration, the cache server 144 may be triggered to transmit a resource to the GPU server 104 for storage in the server resource cache 140 (e.g., based on a predicted need for the resource or based on a signal from the client computing device 102 for caching the resource in GPU server 104) instead of from the client computing device 102.

In some embodiments, the replacement engine 152 may track hashes of each resource stored in the server resource cache 140 (e.g., the cached resources 142). In these embodiments, the replacement engine 142 may compute a hash of a resource as it is received along with a GPU command or compressed GPU command. When the computed hash for the resource and the tracked/stored hash for the resource fail to match, the replacement engine 142 determines that the resource has been altered since stored in the server resource cache 140 and retransmit the resource such that the GPU server 104 can replace the resource in the server resource cache 142. In one embodiment, the replacement engine 142 can be triggered to generate a hash for a resource already stored in the server resource hash 140 in response to the resource being flagged as CPU-mapped or dirty in the client resource cache 132. Although described as resources not being retransmitted if cached/stored in the GPU server 104, in some embodiments, resources are transmitted to the GPU server 104 based on the size of the resource. For example, in some embodiments, smaller resources (e.g., textures/buffers below a certain threshold size) are not hashed but instead are sent in their entirety.

Figure 2:
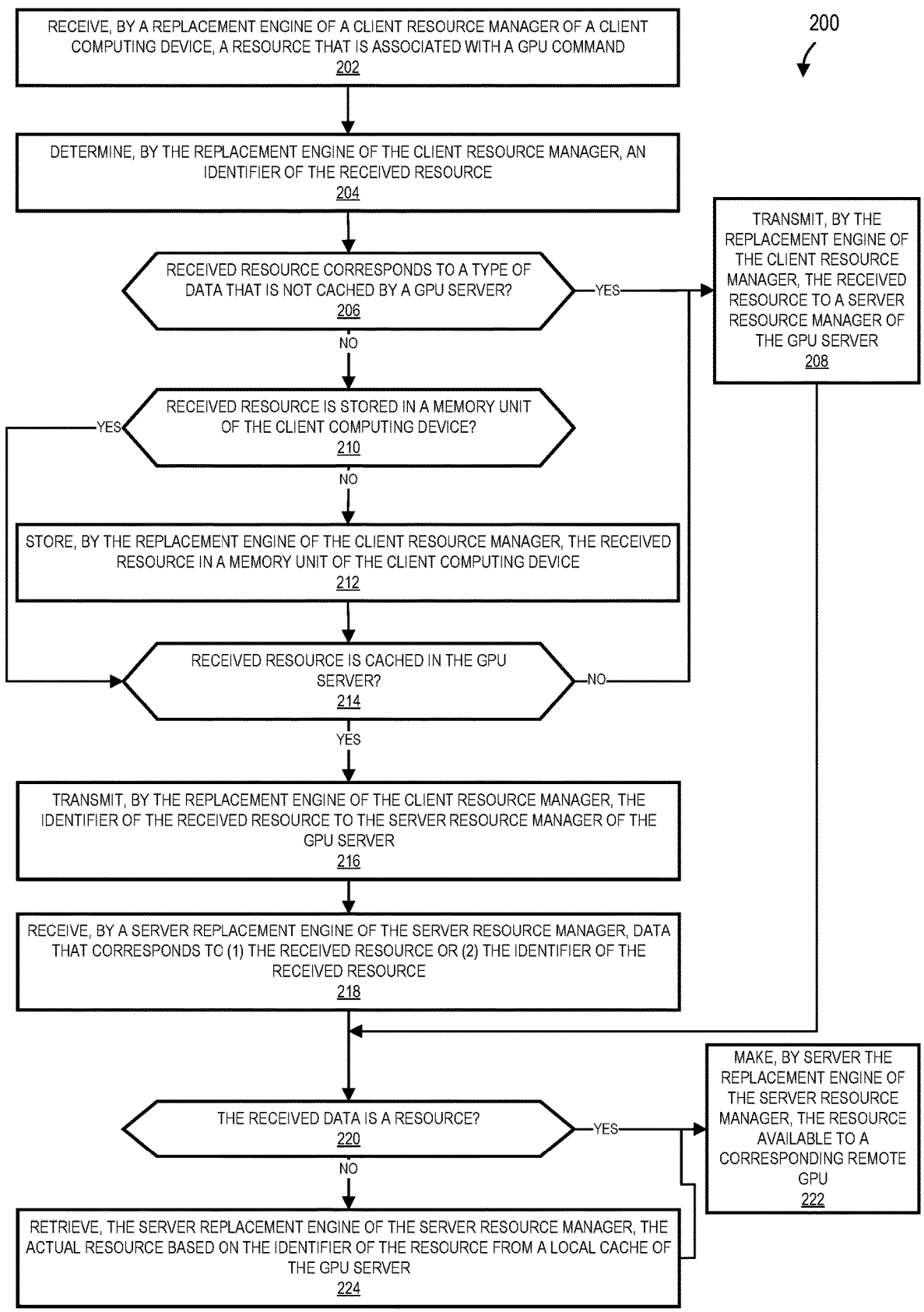
FIG. 2 shows a method for managing resources, in accordance with some embodiments of the present disclosure.

FIG. 2 shows a method 200 for managing resources, according to one example embodiment. The method 200 may be performed by one or more components of the system 100. For example, the method 200 may be performed by the client resource manager 150 of the client computing device 102. For purposes of illustration, the method 200 will be described in relation to the replacement engine 152 of the client resource manager 150 and the replacement engine 156 of the server resource manager 154; however, the method 200 may be performed in combination with other elements of the client computing device 102 and the GPU server 104. Further, although shown in a particular order, in some embodiments, the operations of the method 200 may be performed in a different order. For example, although the operations of the method 200 are shown in a non-overlapping sequential order, in some embodiments, one or more of the operations of the method 200 can be performed in partially or entirely overlapping time periods. To the extent the operations are not dependent on prior operations, they may be performed in any order. Accordingly, the representation of the method 200 is for illustrative purposes.

As shown in FIG. 2, the method 200 can commence at operation 202 with receipt of a resource. For example, the replacement engine 152 may receive the resource from the display driver 114 at operation 202. The received resource may be texture data or geometry data corresponding to a frame/portion of a frame to be displayed to a user of the client computing device 102. In one embodiment, the received resource may be included within or be otherwise associated with a GPU command (or compressed GPU command), which may also be received by the replacement engine 152.

At operation 204, the replacement engine 152 determines an identifier for the received resource. In one embodiment, the identifier may be a hash computed based on the received resource (e.g., a hash computed based on the size of the resource (e.g., a draw size or a buffer size)). The identifier uniquely identifies the received resource from all other resources potentially used by the client computing device 102 and the GPU server 104.

At operation 206, the replacement engine 152 determines whether the received resource corresponds to a type of data that is cached by the GPU server 104 or to a type of data that is not cached by the GPU server 104. For example, the GPU server 104 may be configured to only cache/store a particular type of data in the server resource cache 140. For instance, the particular type of data may be texture data. In this scenario, when the received resource from operation 202 is texture data, the replacement engine 152 may determine at operation 204 that the received resource corresponds to a type of data that is cached by the GPU server 104. Conversely, when the received resource from operation 202 is geometry data, the replacement engine 152 may determine at operation 204 that the received resource corresponds to a type of data that is not cached by the GPU server 104. In one embodiment, types of data that are not often cached include time sensitive data, such as geometry data, that will not likely be relevant after a period of time. In one embodiment, the type of data that is not cached may also include smaller resources. In response to determining that the received resource corresponds to a type of data that is not cached by the GPU server 104, the method 200 moves to operation 208.

At operation 208, the replacement engine 152 transmits the received resource to the GPU server 104. In one embodiment, the resource is transmitted to the GPU server 104 along with a corresponding GPU command that the resource is part of or is associated with. In one embodiment, the resource can be compressed (when this was not previously performed by the display driver 114) using one or more compression algorithms (e.g., Huffman encoding, transform encoding, run-length encoding, etc.) prior to transmission to the GPU server 104. In one embodiment, the resource is received by the server resource manager 154 of the GPU server 104 following the transmission from the client computing device 102.

Returning to operation 206, in response to determining that the received resource corresponds to a type of data that is cached by the GPU server 104, the method 200 moves to operation 210. At operation 210, the replacement engine 152 determines if the received resource is stored within a memory unit 130 (e.g., in permanent and/or local storage) of the client computing device 102. For example, the replacement engine 152 may determine if the received resource is in the memory units 130 of the client computing device 102, in the client resource cache 132, or the main memory 134 by comparing the identifier of the received resource, which was determined at operation 204, with identifiers of cached resources 136 in the client resource cache 132 and non-cached resources 138 in the main memory 134. In response to determining that the received resource is not in memory, the method 200 moves to operation 212.

At operation 212, the replacement engine 152 moves/stores the received resource in a memory of the client computing device 102. For example, the replacement engine 152 can store the received resource in the cached resources 136 in the client resource cache 132 and/or the non-cached resources 138 in the main memory 134 at operation 212.

Following operation 212 or in response to determining at operation 210 that the received resource is stored in a memory of the client computing device 102, the method 200 moves to operation 214.

At operation 214, the replacement engine 152 determines if the received resource is cached or otherwise accessible in the GPU server 104 (e.g., accessible to the remote GPUs 110 in the GPU server 104). In one embodiment, the replacement engine 152 maintains a listing of identifiers for resources transmitted to the GPU server 104. At operation 214, the replacement engine 152 determines if the identifier of the received resource is among the listing of identifiers for resources transmitted to the GPU server 104 to determine if the received resource is cached in the GPU server 104. In one embodiment, the replacement engine 152 may take into account a minimal save time in determining if the received resource is cached in the GPU server 104. The minimal save time is a time period in which a resource will be evicted by the server resource cache 140 if it was not referenced during this time period. For example, if the minimal save time is three seconds and the last time a reference to a particular resource was made was over three seconds ago, the replacement engine 152, in one embodiment, assumes the resource was evicted from the server resource cache 140 and is no longer cached or otherwise available in GPU server 104. In response to determining that the received resource is not cached or otherwise accessible in the GPU server 104, the method 200 moves to operation 208 to transmit the received resource to the GPU server 104.

Conversely, in response to determining that the received resource is cached or otherwise accessible in the GPU server 104, the method 200 moves to operation 216. At operation 216, the replacement engine 152 transmits the identifier of the resource to the GPU server 104 instead of the resource itself. The GPU server 104 can use the identifier to access the correct resource from the server resource cache 140. In one embodiment, a corresponding GPU command of the received resource is transmitted to the GPU server 104 along with the identifier of the received resource. In this embodiment, the GPU command is modified to include the identifier of the received resource instead of the received resource prior to transmission of the GPU command.

At operation 218, the server replacement engine 156 of the server resource manager 154 receives data from the client computing device 102, which is either the resource, which was transmitted at operation 208, or the identifier of the resource, which was transmitted at operation 216. As noted above, the resource or the identifier of the resource may be included within a GPU command that is transmitted to server the replacement engine 156 of the server resource manager 154.

At operation 220, the server replacement engine 156 determines if the received data is a resource or an identifier of a resource. In response to determining that the received data is a resource (e.g., the resource, which was transmitted at operation 208), the method 200 moves to operation 222.

At operation 222, the server replacement engine 156 forwards the resource or otherwise makes the resource available to a corresponding remote GPU 110. In particular, the server replacement engine 156 can (1) transmit a corresponding GPU command along with the resource to a remote GPU 110 for processing and/or (2) store the resource in the cached resources 142 of the server resource cache 140, such that the resource can be available for later access by the remote GPUs 110. When stored in the cached resources 142 of the server resource cache 140, the resource not only becomes available for processing a current GPU command but also later received GPU commands (as long as the resource has not been evicted).

Returning to operation 220, in response to determining that the received data is a not a resource but instead an identifier of the resource (e.g., the identifier of the resource, which was transmitted at operation 216), the method 200 moves to operation 224. At operation 224, the server replacement engine 156 retrieves the actual resource based on the identifier of the resource from a local cache of the GPU server. For example, in one embodiment, the server replacement engine 156 access the resource from the cached resources 142 based on the identifier of the resource. Following operation 224, the method 200 moves to operation 222 to make the resource, which was retrieved at operation 224, available to a corresponding remote GPU 110. The process then ends.

Returning to FIG. 1A, in one embodiment, the client computing device 102 may store or otherwise have access to a list of resources available to the GPU server 128, which may be used to determine if the GPU server 104 has access to the received resource. For example, upon connecting with the GPU server 104, the client computing device 102 may receive from the GPU server 104 a list of resources available to the GPU server 128 (i.e., a list of the set of cached resources 142 in the server resource cache 140). In this embodiment, the GPU server 104 maintains a copy of the list of resources available locally to the GPU server 128 (list of resources available to the GPU server 128A) and the client computing device 102 maintains a copy of the list of resources available to the GPU server 128 (list of resources available to the GPU server 128B).

As resources are transmitted from the client computing device 102 to the GPU server 104 and stored in the server resource cache 140, each party updates their respective list of resources available to the GPU server 128. The GPU server 104 may periodically update the server resource cache 140 based on a retention/eviction policy 146 (e.g., evict/remove a resource from the set of cached resources 142 in the server resource cache 140) and communicate these updates to the client computing device 102 such that the list of the set of cached resources 142 can be updated by both the GPU server 104 and the client computing device 102. Further, in some embodiments, the client computing device 102 can transmit an eviction list to the GPU server 104. The eviction list identifies resources that are to be evicted or otherwise deleted from caches and memory units of the GPU server 104. For example, the eviction list can be generated and transmitted following the end/closing of an application 108. In response to the eviction list, the server resource manager 154 can remove/delete these resources identified in the eviction list from the server resource cache 140 and transmit an acknowledgement (ACK) of the eviction to the client resource manager 150.

In some embodiments, the server resource cache 140 may be packed or initialized based on several criteria. For example, the server resource cache 140 may be packed using one or more of (1) startup resources 170A, (2) common resources 170B, (3) recent resources 170C, and (4) predicted resources 170D.

Startup resources 170A are resources that are likely to be used when an application 108 is initializing or when a phase/level/scene of an application 108 initializes. These resources may not be used frequently, or at all, after initialization, but caching them in the GPU server 104 improves startup and load times of the application 108. Common resources 170B are resources that are reused commonly as an application 108 is running (e.g., used a threshold number of times during a discrete period). For example, a resource may be considered a common resource 170B when it is used $2^n$ times/instance (e.g., sixteen times) during the run of an application 108 or during another time period. Recent resources 170C are resources that have recently been transmitted to the GPU server 104 from the client computing device 102 (e.g., either through reference or the entire resource is transmitted). These recent resources 170C may be retained by the server resource cache 140 for a minimal save time (as determined by the retention/eviction policies 146 of the GPU server 104). Recent resources 170C that receive more than one reference (or a threshold number of references) within the minimal save time may become common resources 170B. Predicted resources 170D are resources that may be added to a server resource cache 140 before they are needed due to a prediction that they will be needed soon (e.g., upon a user of a video game application 108 entering a room, resources associated with the room may be loaded into the server resource cache 140).

In some embodiments, the server resource cache 140 can be packed or initialized based on cache packs or standalone resources stored in a cache server 144. In one embodiment, a cache server 144 may be communicatively coupled to the GPU server 104 via network(s) 160. The network 160 may overlap with the network 106. In one embodiment, cache server 144 may be coupled to remote GPU server 104 directly, or may be located in the same server system or rack.

In some embodiments, the cache server 144 may include several types of cache packs 172, including one or more of (1) standard cache packs 172A that include startup resources 170A that are common across all applications 108 (e.g., resources that see frequent use across all applications 108), (2) game/application cache packs 172B that include startup resources 170A specific to a particular application 108 (e.g., resources that see frequent use when a particular application 108 is running), and (3) player/user-application/game cache packs 172C that include startup resources 170A specific to a particular combination of application 108 and user (e.g., resources that see frequent use when a particular user runs a specific application 108). Each of the cache packs 172 may be created and updated by a packer process 174, in one embodiment.

The packer process 174 may monitor one or more of GPU commands processed by the GPU server 104 and the server resource cache 140 to determine patterns/trends in usage of applications 108 by users to determine resources to include in the standard cache packs 172A, the game/application cache packs 172B, and the player/user-application/game cache packs 172C. In some embodiments, layered cache packs 172 can be used that include a reference to another cache pack 172 and potentially one or more additional resources. Each layered cache pack 172 incorporates/includes the resources referenced by the cache pack 172 and each individually included resource. For example, the packer process 174 may identify an application 108 utilizing GPU server 104, and create a first application cache pack 172B. If a new version of that application 108 is later identified by the packer process 174, a second application cache pack 172B is created for the new version of the application 108. In one embodiment, to save storage space, the second application cache pack 172B may incorporate resources from the first application cache pack 172B by reference and potentially one or more additional resources such that the first application cache pack 172B is associated with a subset of resource from the second application cache pack 172B.

Although memory of the client computing device 102, the GPU server 104, and the cache server 144 are described as separate, in some embodiments, memory can be shared across two or more of these devices to provide a shared workspace. For example, the client resource cache 132 can be partially or entirely located within the server resource cache 140 such that the remote GPUs 110 have direct access to all resources cached by the client computing device 102. Alternatively, the server resource cache 140 can be partially or entirely located within the client resource cache 132 such that the client computing device 102 can more directly control or monitor what resources are cached for the remote GPUs 110. In some embodiments, the shared memory workspace can be located on the cache server 144. In particular, one or more of (1) the server resource cache 140 and (2) the client resource cache 132 can be partially or entirely located within memory of the cache server 144. In this embodiment, the cache server 144 can more directly indicate or monitor what resources are cached for the GPU server 104 and/or the client computing device 102.

In one embodiment, the client computing device 102 can request a set of resources to be cached in the GPU server 104 via a cache request.

Figure 3:
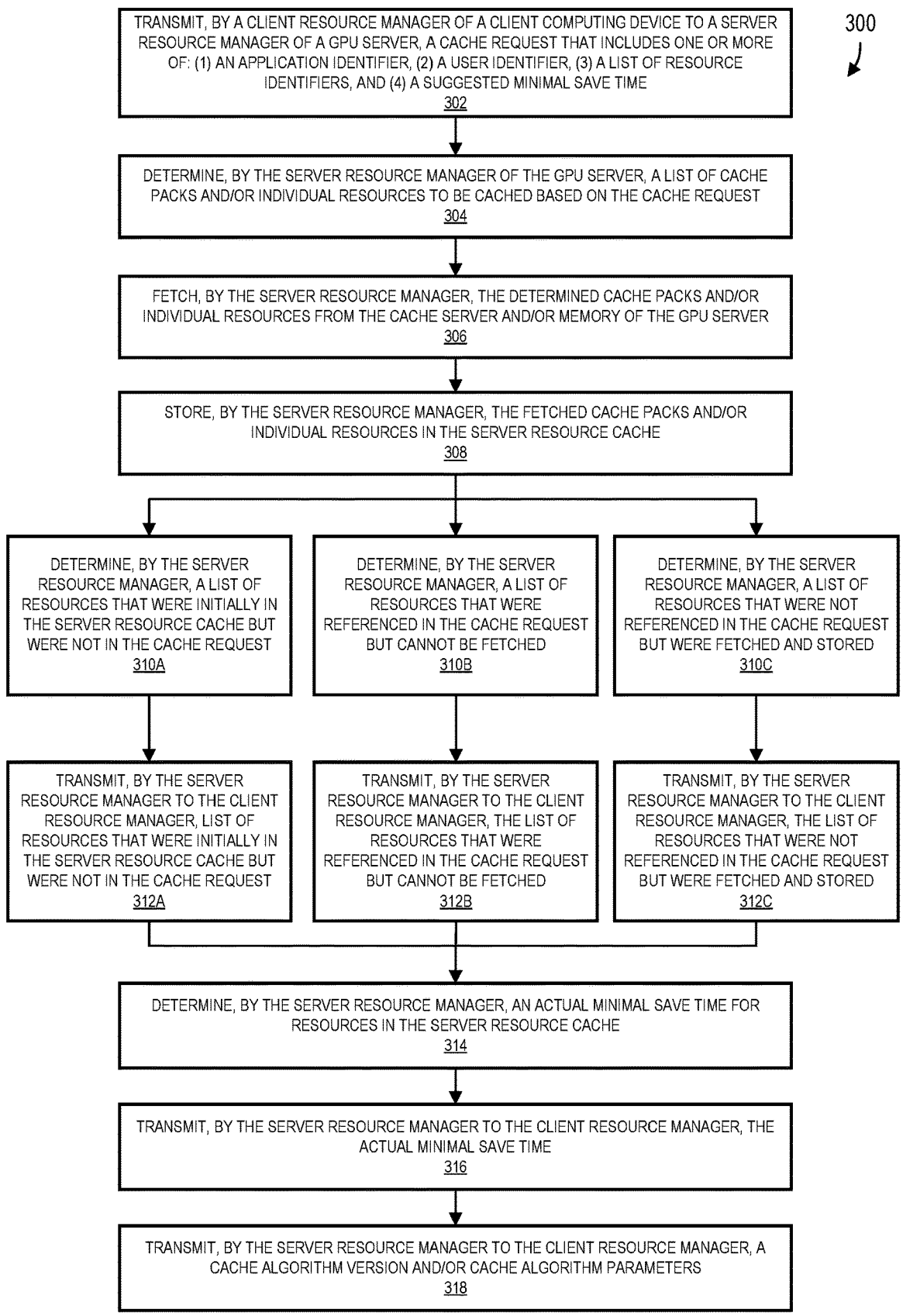
FIG. 3 shows a method for managing resources between the client computing device and the GPU server, in accordance with some embodiments of the present disclosure.

FIG. 3 shows a method 300 for managing resources between a client computing device and a remote GPU server, according to one embodiment. The method 300 may be performed by one or more components of the system 100. Further, although shown in a particular order, in some embodiments, the operations of the method 300 may be performed in a different order. For example, although the operations of the method 300 are shown in a non-overlapping sequential order, in some embodiments, one or more of the operations of the method 300 can be performed in partially or entirely overlapping time periods. Accordingly, the representation of the method 300 is for illustrative purposes.

As shown in FIG. 3, the method 300 may commence at operation 302 with the client resource manager 150 of the client computing device 102 transmitting to the server resource manager 154 of the GPU server 104, a cache request. The cache request includes one or more of (1) an application identifier, which identifies an application 108, (2) a user identifier, which identifies a user of the application 108, (3) a list of resource identifiers, which lists resources to be cached in the server resource cache 140 of the GPU server 104 (e.g., identifiers of individual resources or cache packs 172 of resources), and (4) a suggested minimal save time for the GPU server 104 to apply to cached resources 142 in the server resource cache 140.

At operation 304, the server resource manager 154 determines a set of cache packs 172 and/or individual resources to include in the server resource cache 140 based on the cache request. For example, using the application identifier and/or user identifier from the cache request, the server resource manager 154 may determine one or more of (1) a standard cache pack 172A that includes startup resources 170A that are common across all applications 108, (2) an application cache pack 172B that includes startup resources 170A specific to the application 108 indicated by the application identifier of the cache request, and (3) a user-application cache pack 172C that includes startup resources 170A specific to a particular combination of application 108 and user indicated by the application and user identifiers of the cache request.

At operation 306, the server resource manager 154 fetches the determined set of cache packs and/or individual resources from the cache server 144 and/or from memory of the GPU server 104. In some embodiments, the GPU server 104 can access the resources/cache packs 172 at the cache server 144 while in other embodiments, the GPU server 104 transmits a request to the cache server 144.

At operation 308, the server resource manager 154 loads/stores the set of cache packs 172 and/or the individual resources from the cache server 144 and/or from memory of the GPU server 104 to the server resource cache 140. As a result, these resources (either from the cache packs 172 or individual resources) become cached resources 142 in the server resource cache 140, which are available for use by the remote GPUs 110.

At operations 310A, 310B, and 310C, the server resource manager 154 may determine a set of lists for reporting to the client computing device 102. In particular, at operation 310A, the server resource manager 154 may determine a list of resources that were initially in the server resource cache 140 but were not in the cache request. At operation 310B, the server resource manager 154 may determine a list of cache packs 172 and/or resources that were referenced in the cache request but cannot be fetched (e.g., is not available in a cache pack 172 in the cache server 144 or in memory of the GPU server 104). At operation 310C, the server resource manager 154 may determine a list of cache packs 172 and/or resources that were not referenced in the cache request but were loaded into the server resource cache 140, such as resources identified based on the application and/or user identifiers.

At operations 312A, 312B, and 312C, the server resource manager 154 reports/transmits the lists determined at operations 310A, 310B, and 310C, respectively, to the client resource manager 150 of the client computing device 102. In one embodiment, at operation 312A, the server resource manager 154 transmit the list of resources that were initially in the server resource cache 140 but were not in the cache request to the client resource manager 150. At operation 312B, the server resource manager 154 transmit the list of cache packs 172 and/or resources that were referenced in the cache request but cannot be fetched/stored to the client resource manager 150. At operation 312C, the server resource manager 154 transmit the list of cache packs 172 and/or resources that were not referenced in the cache request but were loaded into the server resource cache 140 to the client resource manager 150. In one embodiment, these lists may be sent in a single transmission.

At operation 314, the server resource manager 154 determines an actual minimal save time for resources in the server resource cache 140 based on the minimal save time of the cache request. The actual minimal save time is used for managing the server resource cache 140 based on the recommended minimal save time of the cache request.

At operation 316, the server resource manager 154 transmits/reports this actual minimal save time to the client resource manager 150. The client resource manager 150 uses the actual minimal save time for predicting what resources remain present in the resource cache, and which have been evicted. Accordingly, the client resource manager 150 can model the server resource cache 140.

At operation 318, the server resource manager 154 transmits/reports a cache algorithm version and/or cache algorithm parameters to the client resource manager 150. The algorithm version and parameters may correspond to retention/eviction policies 146 for the server resource cache 140 and may allow the client resource manager 150 to better model the server resource cache 140 for predicting what resources have been evicted or retained in the server resource cache 140.

Returning to FIG. 1, as described above, a set of GPU commands (or compressed GPU commands) can be transmitted to the GPU server 104 (particularly the server resource manager 154) and corresponding resources can be efficiently communicated to the GPU server 108 by taking advantage of a set of caches (e.g., the server resource cache 140). The GPU commands, along with corresponding resources, can be passed to a remote GPU 110 for processing. Accordingly, the GPU commands are processed using the resources to produce a set of frames and/or read-back data. Accordingly, the remote GPUs 110 of the GPU server 104 perform processing of the GPU commands on behalf of the client computing device 102. The frames and/or readback data generated by the remote GPUs 110 are passed back to the client computing device 102 where the display driver 114 can either display the frames on the display 120 and/or return the readback data to the requesting application 108.

Although described in relation to the GPU server 104 and corresponding remote GPUs 110, in some embodiments, the display driver 114 may assign GPU commands to either the remote GPUs 110 of the GPU server 104 or a local GPU 116. This hybrid approach allows the local GPU 116 on the client computing device 102 to assist with the processing of GPU commands such that applications 108 running on the client computing device 102 potentially receive performance improvements from both the local GPU 116 and the remote GPUs 110 of the GPU server 104. In cases where there is a cost for using the remote GPUs 110 of the GPU server 104 (e.g., monetary cost or bandwidth costs), the hybrid approach may only use the remote GPUs 110 specifically when the local GPU 116 is inadequate, thus reducing cost incurred through use of the remote GPUs 110. In some embodiments, the local GPU 116 may be primarily used and the remote GPUs 110 of the GPU server 104 are only used when a battery of the client computing device 102 is below a power threshold or when the client computing device 102 is above a threshold temperature (e.g., the client computing device 102 is at risk for overheating). In some embodiments, the remote GPUs 110 of the GPU server 104 are only accessible to GPU commands associated with specific applications 108 (e.g., application 108 that can benefit for higher performance, such as video games).

Figure 4:
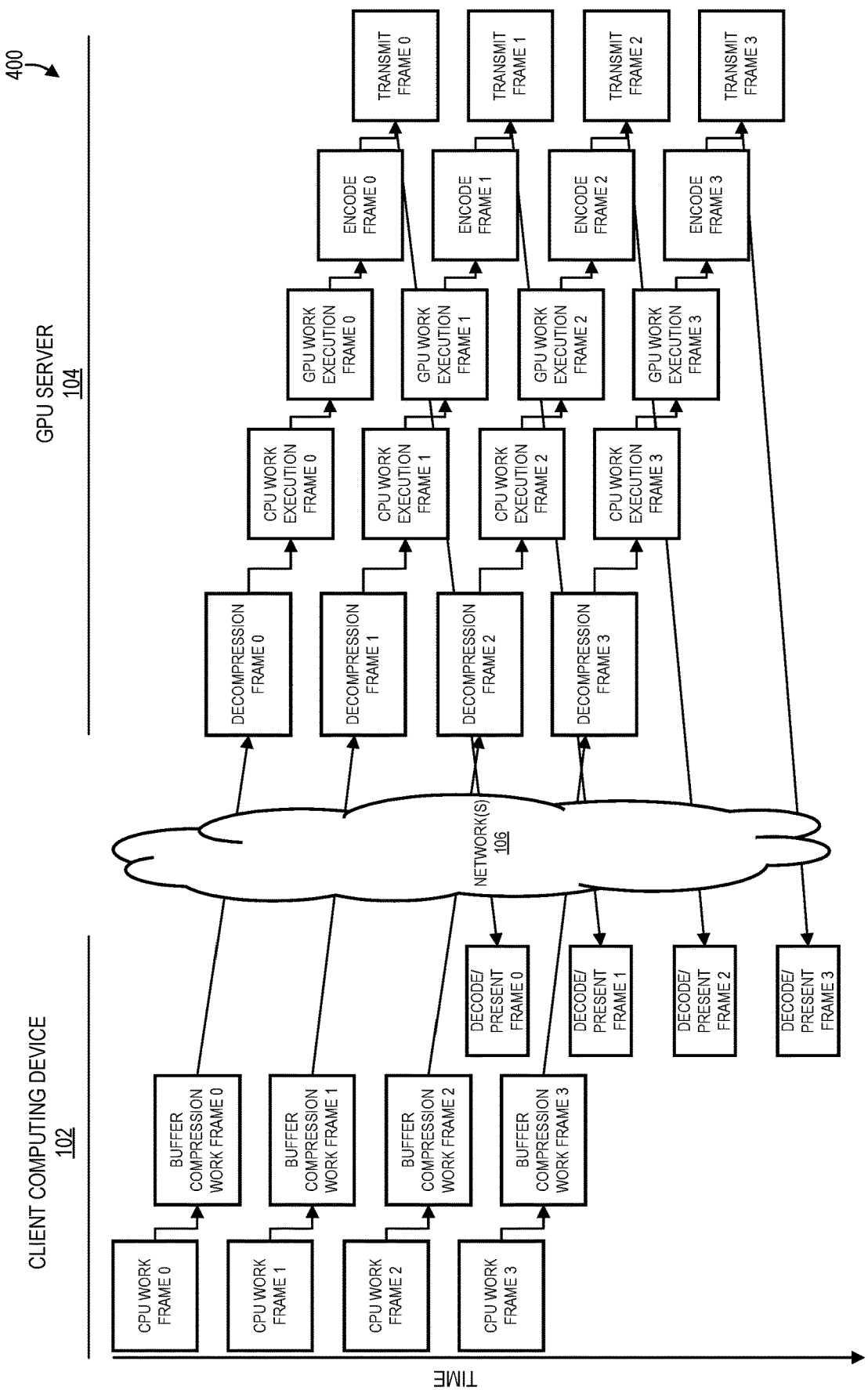
FIG. 4 shows a pipeline of frames being processed by the GPU server and presented to the requesting client computing device, in accordance with some embodiments of the present disclosure.

FIG. 4 shows a pipeline 400 of N+1 frames being forwarded by client computing device 102, processed by the GPU server 104, and presented by requesting client computing device 102. A CPU work frame 0 is generated by an application 108 running on the client computing device 102 as a set of API calls and corresponding GPU commands. The GPU commands representing the CPU work frame 0 can be compressed using one or more techniques described herein and the corresponding buffer compression work frame 0 is transmitted from the client computing device 102, over the network 106, to the GPU server 104. Following receipt of the buffer compression work frame 0, the GPU server 104 generates a decompression frame 0 using one or more decompression techniques. The GPU server 104, via a remote GPU 110, processes the decompression frame 0 to generate a transmit frame 0 through various intermediate states (e.g., CPU execution frame 0, GPU work execution frame 0, and encode frame 0). The transmit frame 0 is transmitted from the GPU server 104 to the client computing device 102 via the network 106 such that a frame (e.g., the decode/present frame 0) can be presented on the display 116 of the client computing device. In one embodiment, the time between the generation of the CPU work frame 0 and the presentation of frame 0 is between 0.0166 seconds (1 frame) and 0.0166×N (N frames). For example, using a low latency network connection, a frame can be generated, and returned by the remote GPU 110 to be displayed every 0.0166 seconds. However, higher latency network connections can increase the time period for sending the command, and receiving the processed data for display. In one embodiment, the time between generation of the CPU work frame 0 by the client computing device 102 and the presentation of a corresponding frame 0 on the display 116 is 3 frames (0.0498 seconds) (i.e., z=3 such that 0.0166×3). The delay may be any length but in one embodiment the delay is between 1 frame length (0.0166 seconds) and 6 frames (0.1 second).

As shown in FIG. 4, while the compression and transmission are occurring for the buffer compression work frame 0, another CPU work frame 1 is being generated for processing in the same fashion. The same processing pipeline is used for this CPU work frame 1 as was used for the CPU work frame 0. This process is illustrated for four cycles through the pipeline and four corresponding sets of frames (e.g., frames designated 0-3). Of course, a standard video game application presents thousands of cycles over the time it is played. Accordingly, through synchronization of processing stages, multiple sets of frames are concurrently being processed by the client computing device 102 and the GPU server 104 such that decode/present frames are continually available for presentation on the display 116 of the client computing device 102. This allows GPU commands from the command buffer 124 to be continually processed to produce frames for presentation to users. In some embodiments, GPU commands can be translated or otherwise adjusted to support the synchronization processing shown in FIG. 4. For example, the Vulkan language can be extended to enable synchronization between stages of the processing pipeline 400 and between different runs of the processing pipeline 400 for separate processing of different frames on the remote GPU server 104.

As shown in FIG. 4, frames are delivered by the remote GPU server 104 to the client computing device 102 at a particular cadence (e.g., twenty-four frames per second) to ensure a prescribed frame rate is achieved for a user of an application 108. Although frames are delivered at a particular cadence, the delay in transmitting GPU commands to the GPU server 104 and returning corresponding frames for display by the client computing device 102 (in comparison to processing by a local GPU), may cause a corresponding application 108 to determine that generation of the frame has stalled or failed. To address this issue without modification of the applications 108, the display driver 114 may return a premature acknowledgement to an application 108 prior to receipt of a frame. This premature acknowledgment indicates to the application 108 that the frame was generated and ready for display even though the frame is not yet ready (e.g., the remote GPUs 110 have not completed processing of GPU commands and associated resources for this frame). Accordingly, a delay caused by network transmission of GPU commands and frames is not evident to the application 108.

In some embodiments, the techniques to account for delays in the pipeline 400 can include progressive transmissions of frames from the GPU server 104 to the client computing device 102. In particular, the GPU server 104 generates a first version of frame at a reduced quality level (e.g., reduced resolution) in comparison to a desired/higher quality level. The reduced quality frame is transmitted for display on the client computing device 102 and is followed by data to enable the display of the frame at a higher quality level that represents the same graphical elements as the reduced quality frame. Since the reduced quality version of the frame can be processed, transmitted, and displayed in a short time period in comparison to a higher quality version of the frame, delays in processing and/or network transmission can be at least partially masked from a user of an application 108 (i.e., the user of the application will view the reduced quality frame only until the higher quality frame is available).

Figure 5:
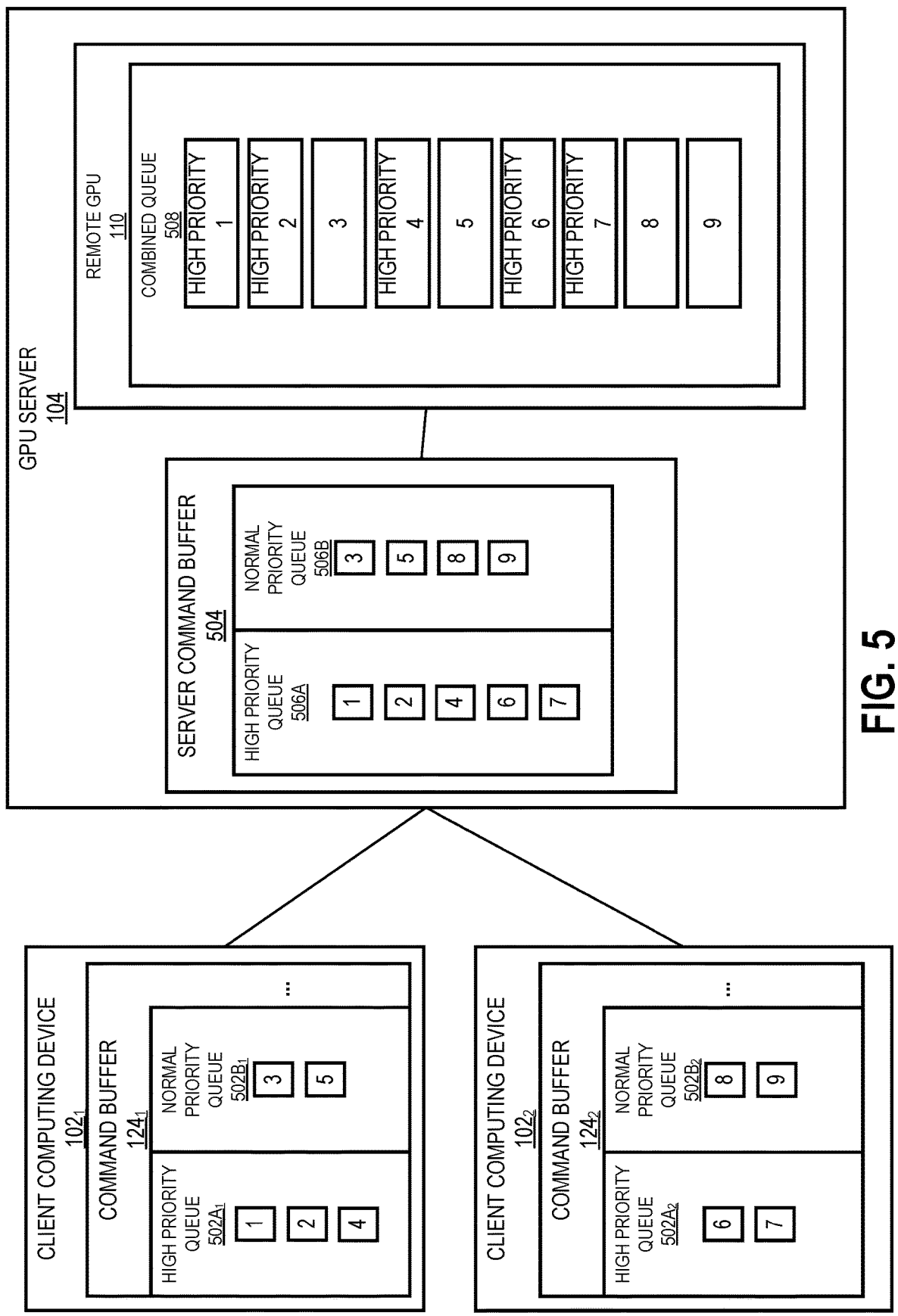
FIG. 5 shows commands buffers used for prioritization of GPU commands by a remote GPU of the GPU server, in accordance with some embodiments of the present disclosure.

In some embodiments, the processing pipeline for processing GPU commands can include a prioritization of GPU commands from one or more client computing devices 102 by a GPU server 104. In particular, as shown in FIG. 5, a client computing device $102_1$ can include a command buffer $124_1$ with a high priority queue $502A_1$ and a normal/low priority queue $502B_1$ and a client computing device $102_2$ can include its command buffer $124_2$ with a high priority queue $502A_2$ and a normal/low priority queue $502B_2$. Although shown with a single normal priority queue 502B in the command buffer 124 of each client computing device 102, in some embodiments, each client computing device's 102 command buffer 124 can include multiple normal priority queues 502B. In one embodiment, the command buffer 124 can include separate priority queues for separate applications 108 and/or separate users. In one embodiment, a command buffer 124 may include multiple levels of priority, e.g. high priority, normal priority, and low priority queues. In some embodiments, a client computing device 102 may include a plurality of command buffers 124, each with one or more queues 502.

The high priority queues 502A include GPU commands that have a higher processing priority than GPU commands included in the normal priority queues 502B. As shown in FIG. 5, the GPU server 104 may include a server command buffer 504 that includes a high priority queue 506A and one or more normal/low priority queues 506B. In one embodiment, the GPU commands in the server high priority queue 506B are received from the client high priority queues 502A from the client computing devices 102 and the GPU commands in the server normal priority queue 506B are received from the client normal priority queues 502B. In one embodiment, the ordering in the server queues is in the order that the commands are received from the clients—indicated in this drawing by numbering. A combined queue 508 of a remote GPU 110 includes the GPU commands with indicators of the priority of the GPU commands (e.g., the GPU commands from the high priority queue 506A are indicated as high priority in the combined queue 508). The remote GPU 110 can prioritize/reprioritize the high and normal priority GPU commands given priorities of the remote GPU. In this fashion, order of execution and pipelining of GPU commands based on priority can be employed by the GPU server 104 and remote GPU 110 to properly share and optimize all executing resources on a server machine. Although only a single remote GPU 110 is illustrated in this figure, it should be understood that a GPU server 104 may include a plurality of remote GPUs 110, and the items from the server command buffer 504 may be distributed to more than one remote GPU 110. In one embodiment, the distribution between the remote GPUs 110 may also be done based on the priority.

Figure 6:
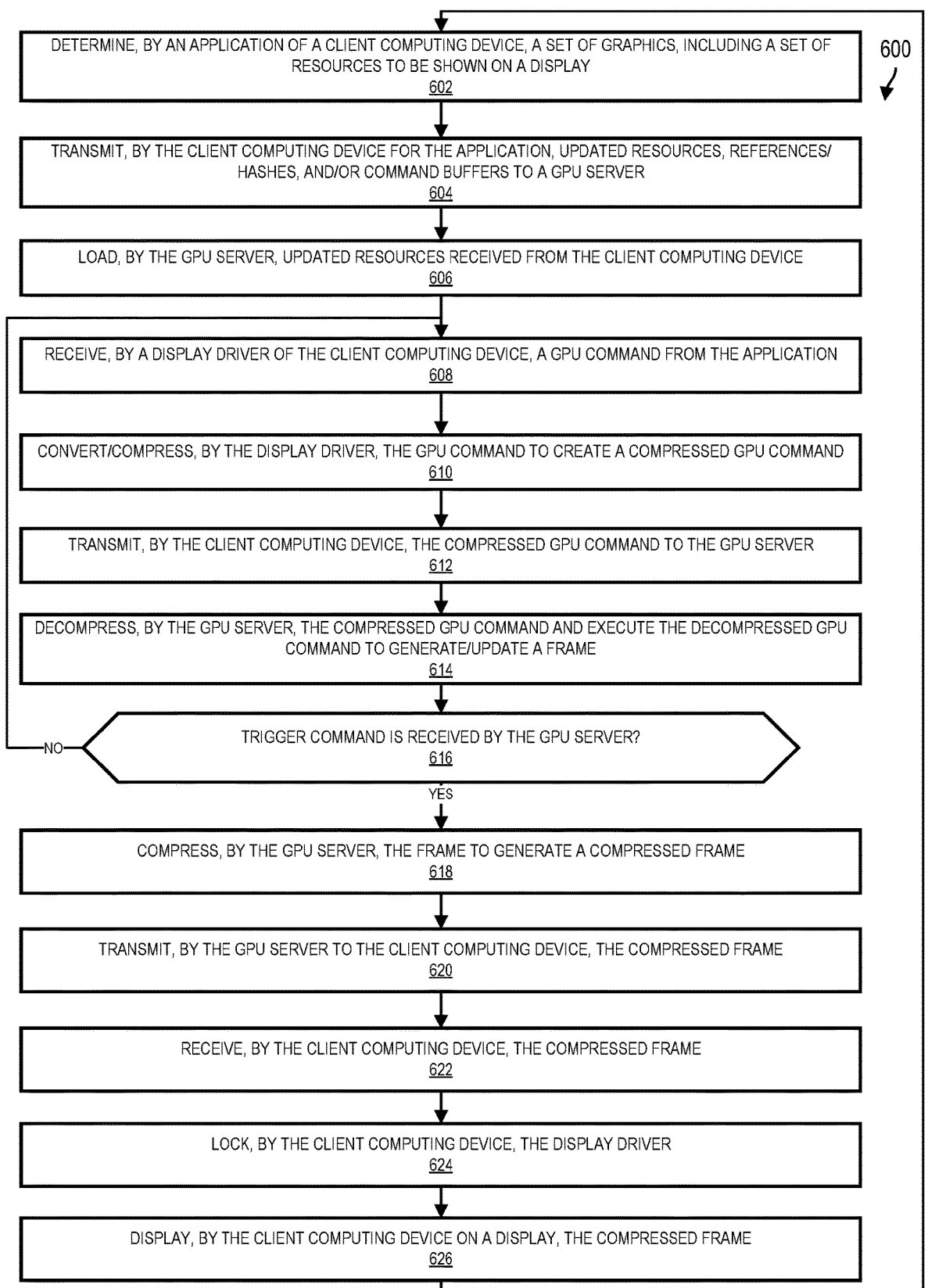
FIG. 6 shows a method for managing resources between the client computing device and the GPU server, in accordance with some embodiments of the present disclosure.

FIG. 6 shows a method 600 for managing resources between the client computing device 102 and the GPU server 104, according to one embodiment. The method 600 may be performed by one or more components of the system 100. Further, although shown in a particular order, in some embodiments, the operations of the method 600 may be performed in a different order. For example, although the operations of the method 600 are shown in a non-overlapping sequential order, in some embodiments, one or more of the operations of the method 600 can be performed in partially or entirely overlapping time periods. Accordingly, the representation of the method 600 is for illustrative purposes.

As shown in FIG. 6, the method 600 may commence at operation 602 with an application $108_1$ of a client computing device 102 determining a set of graphics, including corresponding resources (e.g., textures and geometry data) to be shown to a user of the client computing device 102 on the display 120 of the client computing device 102. In particular, the application 108 may establish a set of resources, including texture data, that will be used for the application 108 and map those resources to memory addresses at operation 602.

At operation 604, the client computing device 102 may transmit, for the application $108_1$, one or more of resources, references/hashes of resources, and command buffers to the GPU server 104 for the determined resources of operation 602. In particular, the client computing device 102 (e.g., the client resource manager 150) may transmit resources or references of resources that will be used by the application $108_1$ for processing GPU commands for the application $108_1$. The resources and references of resources can be included within GPU commands from the command buffer 124 transmitted to the GPU server 104 for processing and/or a dedicated transmission of resources and/or references.

At operation 606, the GPU server 104 may load the resources received from the client computing device 102. In one embodiment, the GPU server 104 may load the resources (e.g., resources received together with GPU commands or resources received separate from GPU commands) to the server resource cache 140, such that these now cached resources 142 can be accessed by the remote GPUs 110 for processing GPU commands received from the client computing device 102. In one embodiment, the GPU server 104 may also load resources from the cache server 144, such that the cached resources 142 include resources from the client computing device 102 and from the cache server 144.

At operation 608, the display driver 114 of the client computing device 102 receives a GPU command that originated from the application $108_1$. In one embodiment, the application $108_1$ may include or otherwise reference one or more API calls and these one or more API calls are translated (e.g., by a graphics API 112) into the GPU command received by the display driver 114.

At operation 610, the display driver 114 converts/compresses the GPU command to generate a compressed GPU command. In one embodiment, the display driver 114 can translate/convert the GPU command from a first language to a second language to generate a compressed GPU command. For instance, the translator/compressor 126 may maintain one or more of a DirectX-to-Vulkan conversion library, an OpenGL-to-Vulkan conversion library, and an OpenCL-to-Vulkan conversion library such that a GPU command that is based on one of DirectX, OpenGL, or OpenCL is converted to the Vulkan language. Although Vulkan is used as the target language, in other embodiments, other target languages can be used. For example, in some embodiments, a derivative of Vulkan can be used to accommodate latency and other concerns/factors in utilizing the remote GPUs 110. In some embodiments, compression of the GPU command to generate the compressed GPU command can include compression of the resources using one or more compression algorithms (e.g., Huffman encoding, transform encoding, run-length encoding, etc.) and/or compression of the GPU command and one more other GPU commands into fewer commands (e.g., removing repetition or reducing overhead associated with similar commands).

At operation 612, the client computing device 102 transmits the compressed GPU command to the GPU server 104. In particular, the client resource manager 150 can transmit the compressed GPU command to the server resource manager 154 via network 106. In some embodiments, the client resource manager 150 can further compress the compressed GPU command prior to transmission by replacing a resource of the compressed GPU command with a reference to the resource when the resource is accessible to the remote GPUs 110 via the server resource cache 140. In one embodiment, the client resource manager 150 can further compress the compressed GPU command prior to transmission using one or more operations of the method 200 shown in FIG. 2.

At operation 614, the GPU server 104 decompresses the compressed GPU command, and executes it to generate or update a frame. In one embodiment, a remote GPU 110 may be assigned or otherwise associated with the application $108_1$ to execute the GPU command using one or more resources that are either passed to the remote GPU 110 with the GPU command or otherwise accessible to the remote GPU 110 in the server resource cache 140. When the compressed GPU command includes or is transmitted with a reference to a resource, the remote GPU server 104 can access the resource from the server resource cache 140 using the reference as a key.

At operation 616, the GPU server 104 determines if a trigger command has been received from the client computing device 102. For example, the GPU server 104 can determine if the compressed GPU command, which was received from the client computing device 102 and processed by the remote GPU server 104, is a trigger command. For example, the trigger command can be a command that causes data to be returned from the remote GPU server 104, such as a Present, Swap Buffers, or Flush command. If the GPU server 104 determines that a trigger command was not received, the method 600 returns to operation 608 to continue receiving GPU commands to update a frame. Conversely, in response to the GPU server 104 determining that a trigger command was received, the method 600 moves to operation 618.

At operation 618, the GPU server 104 compresses the frame that is associated with the application 108 for which GPU commands are being processed. In one embodiment, the frame can be compressed using one or more compression algorithms (e.g., Huffman encoding, transform encoding, run-length encoding, lossy encoding (e.g., 32-bit precision reduced to 16-bit precision), etc.) to generate a compressed frame.

At operation 620, the GPU server 104 transmits the compressed frame to the client computing device 102 via network 106 for display to a user of the application $108_1$. The frame represents the data generated in response to one or more GPU commands, which were received and processed according one or more iterations of operations 602-618.

At operation 622, the client computing device 102 receives the compressed frame from the GPU server 104. In one embodiment, the client computing device 102 can perform decompression on the compressed frame upon receipt and this uncompressed/decompressed frame is displayed on to a user of the application $108_1$ or returned to the application $108_1$, as appropriate.

At operation 624, the client computing device 102 can lock the display driver 114 in preparation of displaying the frame on the display 120 of the client computing device 102. In some embodiments, other components of the graphics processing system 100 can be locked in preparation/anticipation of displaying the framebuffer on the display 120, including a remote GPU 110.

At operation 626, the client computing device 102 displays/presents the frame on the display 116 of the client computing device 102. Although described in relation to processing GPU commands associated with a frame and corresponding graphics, the method 600 can be performed in relation to other forms of data, including non-graphics data. In these cases, the remote GPU 110 generates readback data that is transmitted back to the client computing device 102 and provided to the application $108_1$.

Figure 7:
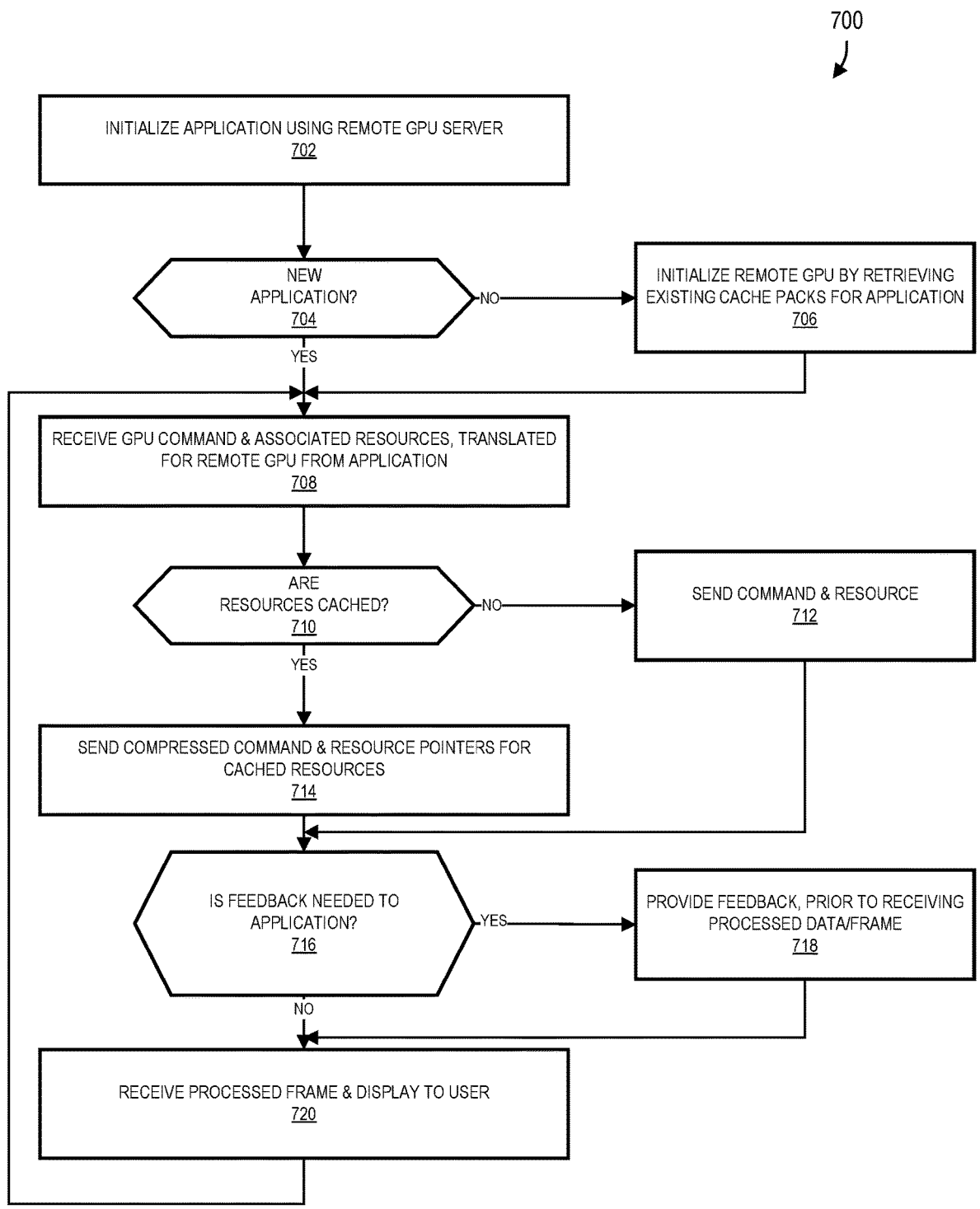
FIG. 7 shows a method for a client computing device to utilize remote GPUs of a GPU server, in accordance with some embodiments of the present disclosure.

FIG. 7 shows a method 700 for the client computing device 102 to utilize remote GPUs 110 of the GPU server 104, according to one embodiment. The method 700 may be performed by one or more components of the system 100. Further, although shown in a particular order, in some embodiments, the operations of the method 700 may be performed in a different order. For example, although the operations of the method 700 are shown in a non-overlapping sequential order, in some embodiments, one or more of the operations of the method 700 can be performed in partially or entirely overlapping time periods. Accordingly, the representation of the method 700 is for illustrative purposes.

As shown in FIG. 7, the method 700 may commence at operation 702 with an application 108, running on a client computing device 102, initializing use of remote GPUs 110 on the GPU server 104. In one embodiment, initialization can include one or more of (1) setting up a display driver 114 and (2) using the configuration interface 122 to setup service with the GPU server 104.

At operation 704, the GPU server 104 determines if the application 108 is a new application 108. In one embodiment, a new application 108 is an application 108 that has not previously used the GPU server 104 to handle processing of GPU commands. In response to determining that the application 108 is not a new application 108, the method 700 moves to operation 706.

At operation 706, the GPU server 104 initializes use of the application 108 with the GPU server 104 by retrieving and loading one or more cache packs 172 or individual resources into the server resource cache 140. In one embodiment, cache packs 172 and/or individual resources are retrieved based on one or more of an identifier of the application 108 and an identifier of a user of the application 108. Each of these identifiers may be included in a cache request that was transmitted at operation 702 when initializing use of the GPU server 104.

Returning to operation 704, in response to determining that the application 108 is a new application 108 or following operation 706, the method 700 moves to operation 708. At operation 708, a GPU command and associated resources are received (e.g., by the client resource manager 150) from the application 108. In one embodiment, the GPU command can be translated to a language corresponding to a remote GPU 110 of the GPU server 104 and/or compressed prior to being received.

At operation 710, the client resource manager 150 determines if the associated resources are cached in the GPU server 104. In one embodiment, the client resource manager 150 may maintain a list of resources available to the GPU server 128B. The list 128B indicates what resources are available in the server resource cache 140 and are thereby accessible to the remote GPUs 110. In this embodiment, the determination at operation 710 may be performed by comparing a hash of the received resources with identifiers/hashes of the resources in the list of resources available to the GPU server 128B to determine whether a match exists. In response to determining that the received resources are not cached in the GPU server 104, the method 700 moves to operation 712.

At operation 712, the client resource manager 150 transmits the GPU command and the resources to the GPU server 104. In particular, since the resources are not cached in the GPU server 104, the resources are sent to the GPU server 104 for use when processing the GPU command.

Returning to operation 710, in response to determining that the resources are cached in the GPU server 104, the method 700 moves to operation 714. At operation 714, the client resource manager 150 transmits the GPU command and a resource pointer for the cached resources (e.g., a hash) to the GPU server 104. The resource pointer may be used for locating the cached resources in the server resource cache 140.

At operation 716, the display driver 114 determines if the application 108 requires feedback regarding processing of the GPU command. In particular, the application 108 may require an acknowledgement that the GPU command was received and/or that processing of the GPU command was successful prior to the expiration of a timeout period. If this acknowledgment is not received, the application 108 may assume the GPU command failed and perform an error handling routine (e.g., resend the GPU command with associated resources and/or return an error). In response to determining that the application 108 requires feedback regarding processing of the GPU command, the method 700 moves to operation 718.

At operation 718, the display driver 114 transmits feedback to the application 108. In one embodiment, the display driver 114 returns a premature acknowledgement to the application 108 prior to receipt of a frame from the GPU server 104. This premature acknowledgment indicates to the application 108 that the frame was generated and ready for display even though the frame is not yet ready (e.g., the remote GPUs 110 have not completed processing of the GPU command and associated resources). Accordingly, a delay caused by network transmission of GPU commands and frames is not evident to the application 108.

Returning to operation 716, in response to determining that the application 108 does not require feedback or following operation 718, the method 700 moves to operation 720. At operation 720, the client computing device 102 (e.g., the display driver 114) receives a processed frame from the GPU server 104 and displays the frame on the display 120 to a user of the application 108.

Figure 8:
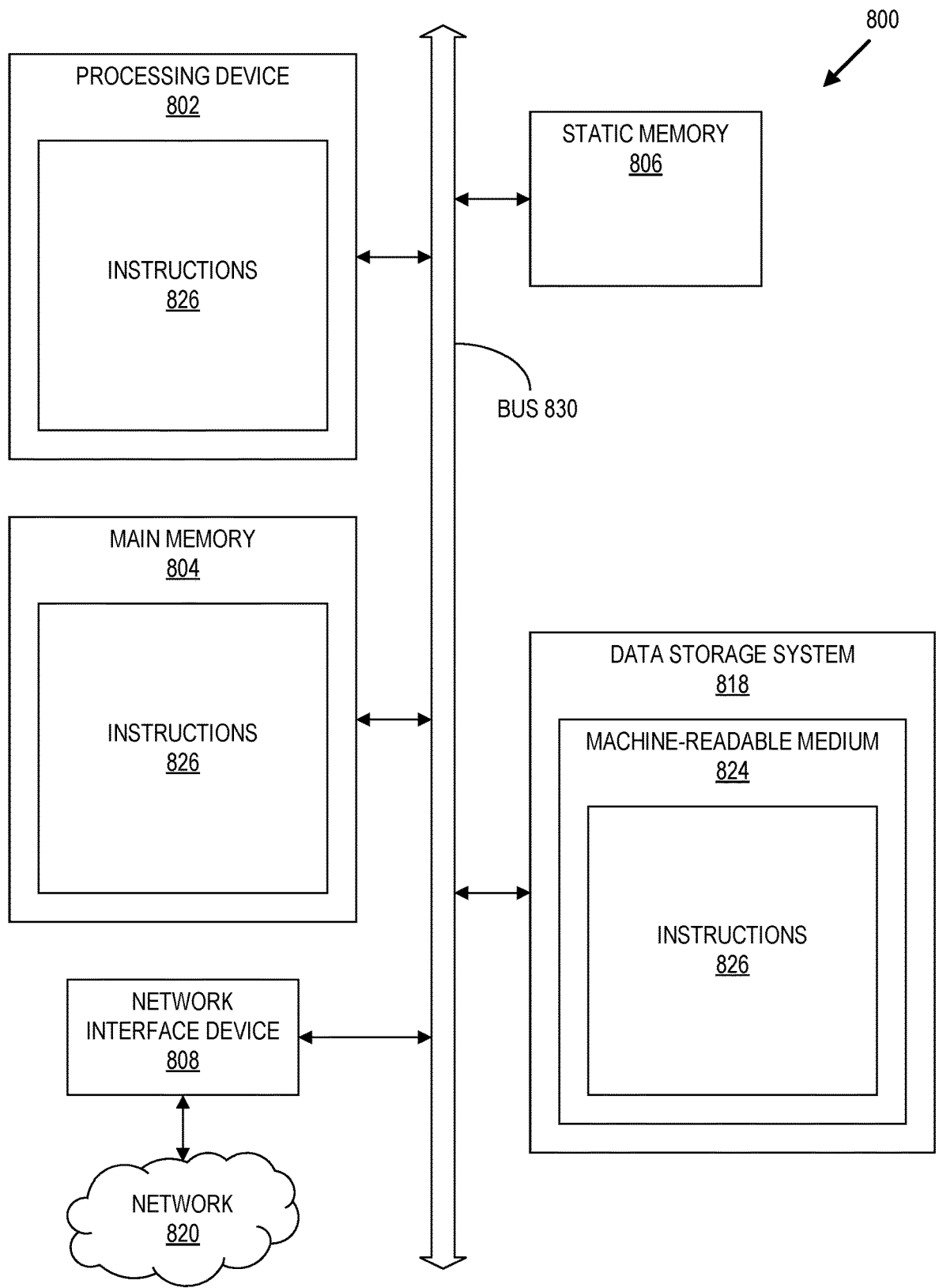
FIG. 8 is a block diagram of an example electronic device or computer system in which embodiments of the present disclosure can operate.

FIG. 8 illustrates an example machine of an electronic device or computer system 800 within which a set of instructions, for causing the machine to perform any one or more of the methodologies discussed herein, can be executed. In some embodiments, the computer system 800 can correspond to a client computer system 102, a GPU server 104, and/or a cache server 144. In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 808 to communicate over the network 820.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media.

In one embodiment, the instructions 826 include instructions to implement functionality corresponding to the components shown in FIG. 1. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system can carry out the methods described herein in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method for processing commands for a client computing device using a remote graphics processing unit server, the method comprising:
receiving, by a display driver of the client computing device, a command from an application operating on the client computing device;
compressing, by the display driver, the command to generate a compressed command, wherein compressing the command includes:
determining whether a resource associated with the command is available in a cache of the remote graphics processing unit server, and
replacing the resource with a reference to the resource, when the resource is available;

transmitting, by the display driver, the compressed command to the remote graphics processing unit server for processing by a remote graphics processing unit (GPU); and receiving, by the display driver, data generated by the remote GPU based on processing the compressed command.

2. The method of claim 1, wherein the client computing device maintains a list of resources available in the cache of the remote graphics processing unit server; and wherein the method further comprises:
setting the command, which includes the resource, as the compressed command, in response to determining that the resource of the command is unavailable in the cache of the remote GPU server, and updating the list of resources available in the cache of the remote GPU server in response to transmitting the resource to the remote GPU server in the compressed command.

3. The method of claim 1, further comprising:
converting, by the display driver, the command from a first language to a second language, wherein the command in the second language is compressed to generate the compressed command, and wherein the second language is a derivative of the Vulkan application programming interface, including synchronization elements to enable remote execution.

4. The method of claim 1, further comprising:
generating, by the display driver, a cache request that includes one or more of (1) an application identifier of the application, (2) a user identifier of a user of the application, (3) a list of resource identifiers, and (4) a minimal save time of resources in a memory of the remote GPU server; and transmitting, by the display driver, the cache request to the remote GPU server, such that the remote GPU server is to maintain a resource cache based on the cache request.

5. The method of claim 4, further comprising:
receiving, by the client computing device, one or more of (1) a list of resources that were not identified by the cache request but were included in the resource cache of the remote GPU server, (2) a list of resources that were identified by the cache request but were not included in the resource cache of the remote GPU server, and (3) a list of resources that are included in the resources cache of the remote GPU server; and receiving, by the client computing device, an actual minimal save time of resources in the memory of the remote GPU server.

6. The method of claim 5, wherein one or more resources included in the resource cache of the remote GPU server are included in a cache pack, which includes a plurality of resources.

7. The method of claim 6, wherein the cache pack represents one or more of (1) resources that are commonly used by multiple applications, including the application, (2) resources that are commonly used by the application, and (3) resources that are commonly used by the application when the user is operating the application.

8. A client computing device that utilizes a remote graphics processing unit server to process commands, the client computing device comprises:

one or more memories; and
a processor coupled to the one or more memories, wherein the one or more memories include instructions that, when executed by the processor, cause the client computing device to:
receive, by a display driver of the client computing device, a command from an application operating on the client computing device, compress, by the display driver, the command to generate a compressed command, wherein compressing the command includes:
determining whether a resource associated with the command is available in a cache of the remote graphics processing unit server, and replacing the resource with a reference to the resource, when the resource is available, transmit, by the display driver, the compressed command to the remote graphics processing unit server for processing by a remote graphics processing unit (GPU), and receive, by the display driver, data generated by the remote GPU based on processing the compressed command.

9. The client computing device of claim 8, wherein the client computing device maintains a list of resources available in the cache of the remote graphics processing unit server; and wherein the instructions, when executed by the processor, further cause the client computing device to:
set the command, which includes the resource, as the compressed command, in response to determining that the resource of the command is unavailable in the cache of the remote GPU server, and update the list of resources available in the cache of the remote GPU server in response to transmitting the resource to the remote GPU server in the compressed command.

10. The client computing device of claim 8, wherein the instructions, when executed by the processor, further cause the client computing device to:
convert, by the display driver, the command from a first language to a second language, wherein the command in the second language is compressed to generate the compressed command, and wherein the second language is a derivative of the Vulkan application programming interface, including synchronization elements to enable remote execution.

11. The client computing device of claim 8, wherein the instructions, when executed by the processor, further cause the client computing device to:
generate, by the display driver, a cache request that includes one or more of (1) an application identifier of the application, (2) a user identifier of a user of the application, (3) a list of resource identifiers, and (4) a minimal save time of resources in a memory of the remote GPU server; and transmit, by the display driver, the cache request to the remote GPU server, such that the remote GPU server is to maintain a resource cache based on the cache request.

12. The client computing device of claim 11, wherein the instructions, when executed by the processor, further cause the client computing device to:
receive one or more of (1) a list of resources that were not identified by the cache request but were included in the resource cache of the remote GPU server, (2) a list of resources that were identified by the cache request but were not included in the resource cache of the remote GPU server, and (3) a list of resources that are included in the resources cache of the remote GPU server; and receive an actual minimal save time of resources in the memory of the remote GPU server.

13. The client computing device of claim 12, wherein one or more resources included in the resource cache of the remote GPU server are included in a cache pack, which includes a plurality of resources.

14. The client computing device of claim 13, wherein the cache pack represents one or more of (1) resources that are commonly used by multiple applications, including the application, (2) resources that are commonly used by the application, and (3) resources that are commonly used by the application when the user is operating the application.

15. A method for a remote graphics processing unit (GPU) server to execute commands for a client computing device, the method comprising:
- receiving, by the remote GPU server, a command from the client computing device, wherein the command is generated by an application running on the client computing device;
- receiving, by the remote GPU server from the client computing device, one of a resource and a reference to the resource, in response to receiving the resource, the resource is processed by a remote GPU of the remote GPU server according to the command;
- in response to receiving the reference to the resource, fetching, by the remote GPU server, the resource from a server resource cache of the remote GPU server;
- executing, by the remote GPU of the remote GPU server, the command using the resource to generate data; and
- transmitting, by the remote GPU server, the data to the client computing device.

16. The method of claim 15, further comprising:
in response to receiving the resource, storing, by the remote GPU server, the resource in the server resource cache for use in executing later commands.

17. The method of claim 15, further comprising:
compressing, by the remote GPU server, the data before transmission to the client computing device.

18. The method of claim 15, further comprising:
- receiving, by the remote GPU server from the client computing device, a cache request that includes one or more of (1) an application identifier of the application, (2) a user identifier of a user of the application, (3) a list of resource identifiers, and (4) a minimal save time of resources in a memory of the remote GPU server,
- fetching, by the remote GPU server, a set of resources from a cache server based on the cache request; and
- storing, by the remote GPU server, the set of resources in the server resource cache.

19. The method of claim 18, wherein the set of resources are included in a cache pack, which includes a plurality of resources, and
wherein the cache pack represents one or more of (1) resources that are commonly used by multiple applications, including the application, (2) resources that are commonly used by the application, and (3) resources that are commonly used by the application when the user is operating the application.

20. The method of claim 15, wherein the reference to the resource is a hash computed on one or more blocks of the resource.

* * * * *